(12) United States Patent
Lu et al.

(10) Patent No.: US 11,435,837 B2
(45) Date of Patent: Sep. 6, 2022

(54) DUAL MODE MOUSE DEVICE

(71) Applicants: DEXIN ELECTRONIC LTD., Guangdong (CN); DEXIN CORPORATION, New Taipei (TW)

(72) Inventors: Ho-Lung Lu, New Taipei (TW); Yuan-Jung Chang, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 202 days.

(21) Appl. No.: 17/004,002

(22) Filed: Aug. 27, 2020

(65) Prior Publication Data
US 2021/0278911 A1    Sep. 9, 2021

(30) Foreign Application Priority Data
Mar. 9, 2020   (TW) .................................. 109107581

(51) Int. Cl.
*G06F 3/0354* (2013.01)
*G06F 13/40* (2006.01)
*G06F 13/42* (2006.01)
*H04W 4/80* (2018.01)

(52) U.S. Cl.
CPC ...... *G06F 3/03543* (2013.01); *G06F 13/4022* (2013.01); *G06F 13/4282* (2013.01); *H04W 4/80* (2018.02); *G06F 2213/0042* (2013.01); *G06F 2213/3814* (2013.01)

(58) Field of Classification Search
CPC ......... G06F 3/03543; G06F 2203/0382; G06F 2203/0384
See application file for complete search history.

(56) References Cited

U.S. PATENT DOCUMENTS

| | | | |
|---|---|---|---|
| 2006/0094461 A1* | 5/2006 | Hameed | G06F 3/038 455/552.1 |
| 2006/0250380 A1* | 11/2006 | Oliver | G06F 3/03545 345/179 |
| 2015/0212598 A1* | 7/2015 | Lee | G06F 3/0362 345/166 |

* cited by examiner

*Primary Examiner* — Kevin M Nguyen
(74) *Attorney, Agent, or Firm* — Li & Cai Intellectual Property Office

(57) ABSTRACT

A dual mode mouse device including a first mouse and a wireless signal transceiver is provided. When the first mouse is electrically connected to the wireless signal transceiver through a first wire, a first mouse control signal of the first mouse is transmitted to the wireless signal transceiver through the first wire. A USB signal processing module of the wireless signal transceiver converts the first mouse control signal into a USB communication protocol control signal that is provided to an electronic device. When the first mouse is not electrically connected to the wireless signal transceiver through the first wire, the first mouse control signal of the control module of the first mouse is transmitted to the wireless communication module of the wireless signal transceiver to control the electronic device through the first mouse communication module.

9 Claims, 5 Drawing Sheets

DUAL MODE MOUSE DEVICE

CROSS-REFERENCE TO RELATED PATENT APPLICATION

This application claims the benefit of priority to Taiwan Patent Application No. 109107581, filed on Mar. 9, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse device, and more particularly to a dual mode mouse device.

BACKGROUND OF THE DISCLOSURE

A wireless mouse is usually communicatively connected to a wireless signal transceiver, or communicatively connected to electronic devices directly through having a Bluetooth® communication module disposed in the wireless mouse to control cursors of the electronic devices. However, since the volume of data transmission between the wireless mouse and the wireless signal transceiver is significantly high and the power consumption of the Bluetooth® communication module is also quite significant, the battery consumption speed and constant charging of the wireless mouse increases correspondingly. Although a wired mouse is communicatively connected to electronic devices through a wire, the uses of the wired mouse are significantly limited, and the amount of data transmission does not cause a burden on the power consumption of the wired mouse.

Therefore, providing a dual mode mouse device that can not only reduce the volume of data transmission, but also combines advantages of both a wireless mouse and a wired mouse has been an important matter of the industry.

SUMMARY OF THE DISCLOSURE

In response to the above-referenced technical inadequacies, the present disclosure provides a dual mode mouse device.

In one aspect, the present disclosure provides a dual mode mouse device that includes a first mouse, a control module, a cursor positioning sensing module, a power module, a mouse wireless communication module, a mouse port, and a wireless signal transceiver. The cursor positioning sensing module is electrically connected to the control module. The power module is electrically connected to the control module. The mouse wireless communication module is electrically connected to the control module. The mouse port is electrically connected to the control module. The control module transmits a plurality of control signals, and the control module is electrically connected to the cursor positioning sensing module, the power module and the mouse wireless communication module of the first mouse. The wireless signal transceiver includes a processing module, a first port, a second port, a storing module, a wireless communication module, and a USB signal processing module. The USB signal processing module is electrically connected to the first port, the second port, and the processing module. The wireless communication module is electrically connected to the processing module and the storing module. The first port is electrically connected to an electronic device. When the first mouse is electrically connected to the second port of the wireless signal transceiver through a first wire, a first mouse control signal of the control module of the first mouse is transmitted to the wireless signal transceiver through the first wire, and the wireless signal transceiver utilizes the USB signal processing module to convert the first mouse control signal into a USB communication protocol control signal that is provided to the electronic device. When the first mouse is not electrically connected to the second port of the wireless signal transceiver through the first wire, the first mouse control signal of the control module of the first mouse is transmitted to the wireless communication module of the wireless signal transceiver through the mouse wireless communication module that is provided to the electronic device through the USB signal processing module by the processing module of the wireless signal transceiver.

One of the advantages of the present disclosure is that the dual mode mouse provided by the present disclosure can reduce the data transmission volume between the mouse and the wireless signal transceiver and effectively reduce the cost through the unique design of the mouse and the wireless signal transceiver.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
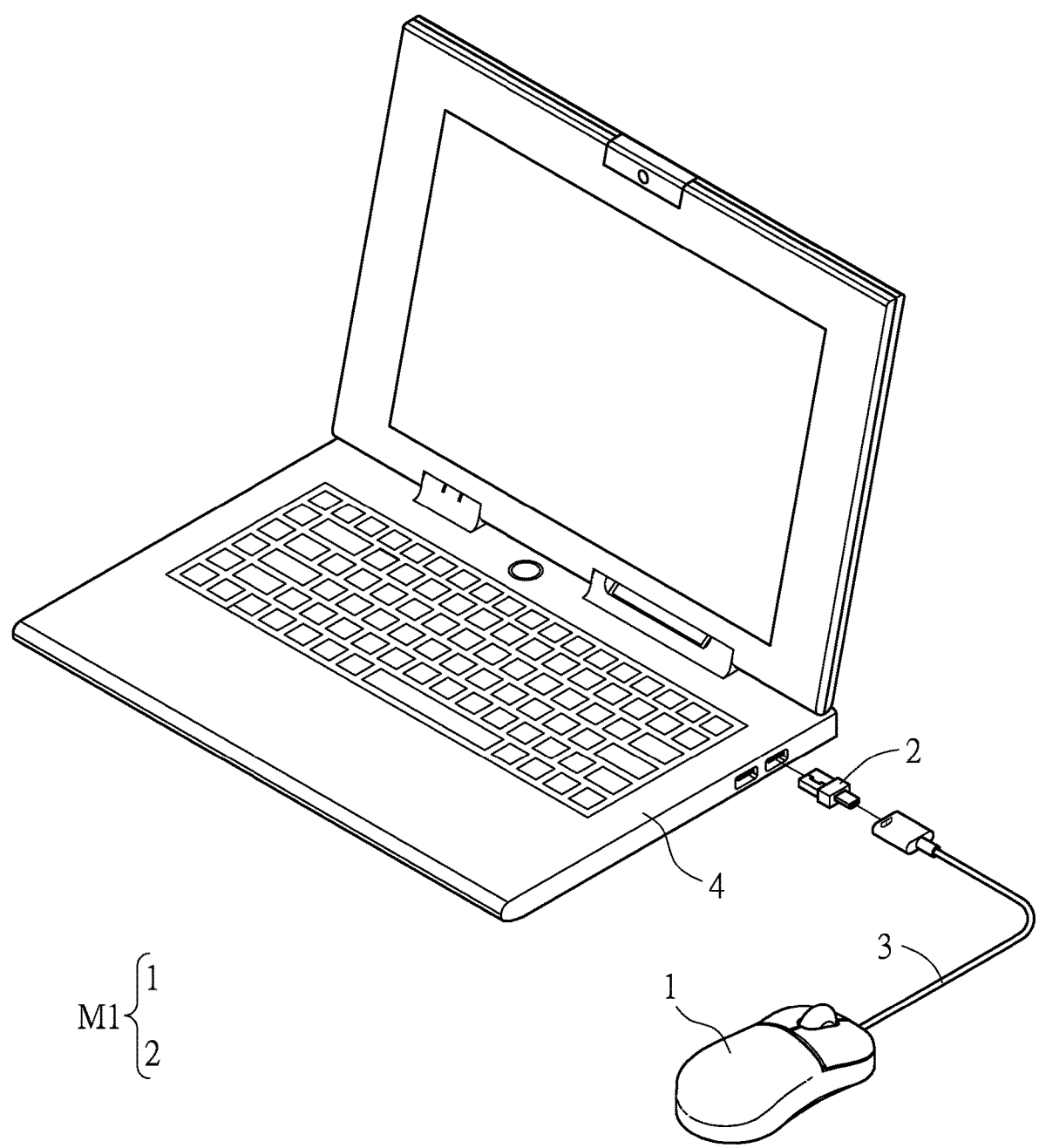
FIG. 1 is a first schematic view of a dual mode mouse device in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
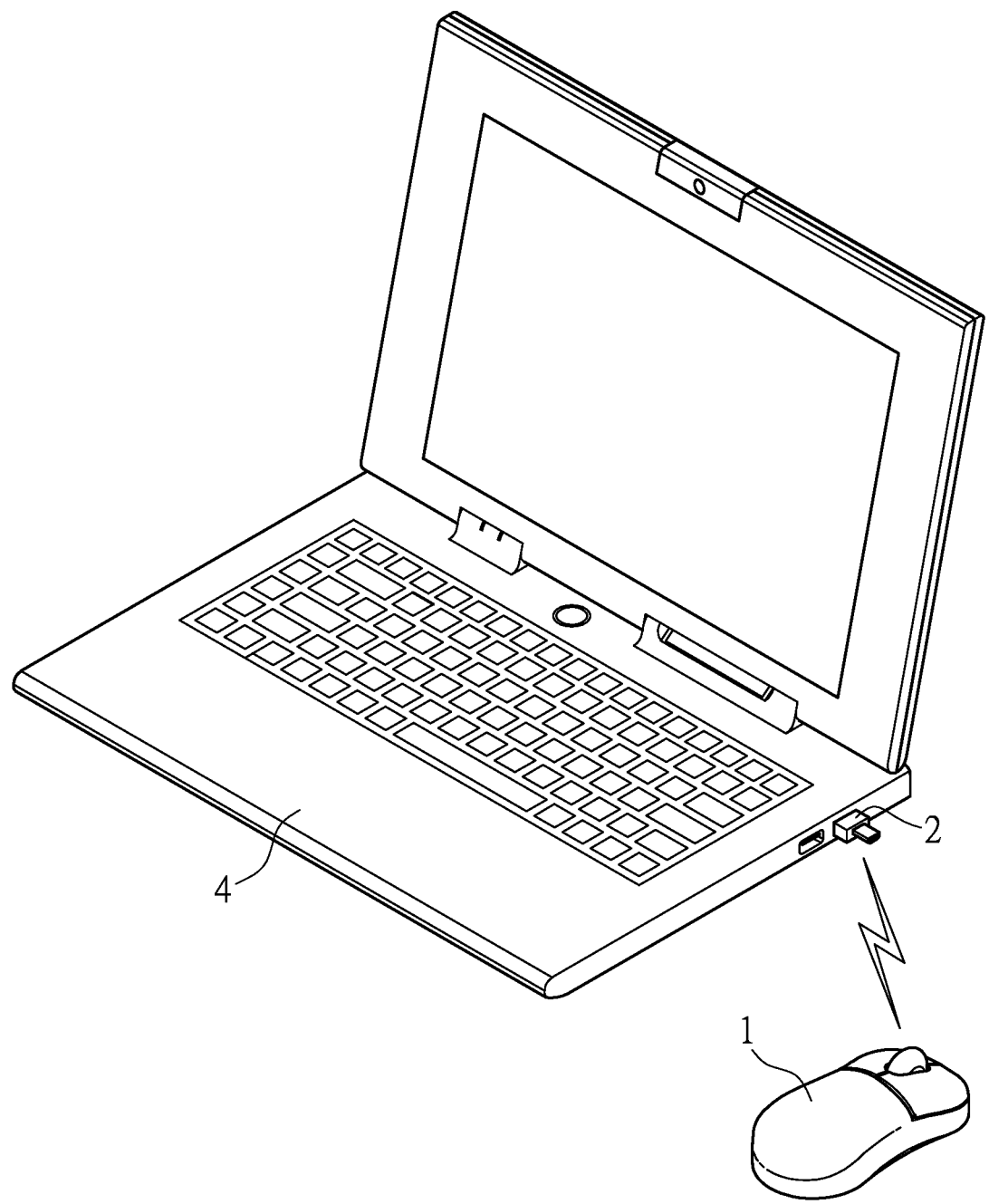
FIG. 2 is a second schematic view of a dual mode mouse device in one embodiment of the present disclosure.
Figure 3:
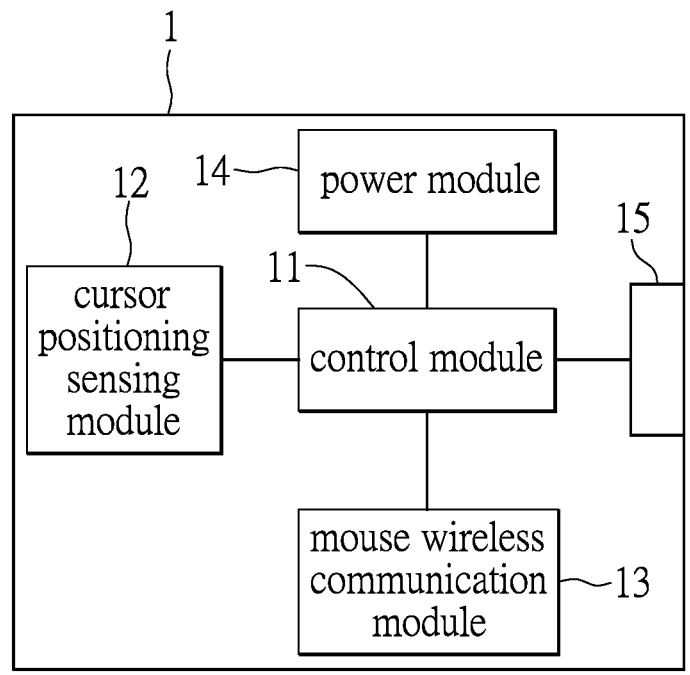
FIG. 3 is a block diagram of a first mouse in one embodiment of the present disclosure.
Figure 4:
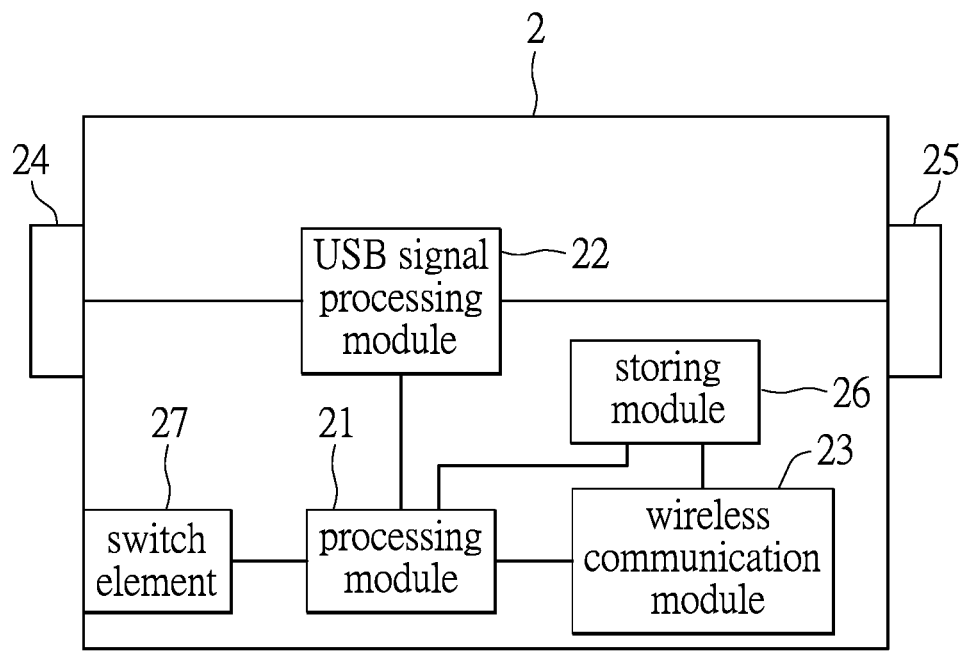
FIG. 4 is a block diagram of a wireless signal transceiver in one embodiment of the present disclosure.

Reference is made to FIG. 1, which is a first schematic view of the dual mode mouse device in one embodiment of the present disclosure. Reference is made to FIG. 2, which is a second schematic view of the dual mode mouse device in one embodiment of the present disclosure. Reference is made to FIG. 3, which is a block diagram of a first mouse in one embodiment of the present disclosure. Reference is made to FIG. 4, which is a block diagram of a wireless signal transceiver in one embodiment of the present disclosure.

As shown in FIG. 1, a dual mode mouse device M1 includes a first mouse 1 and a wireless signal transceiver 2. The first mouse 1 is electrically connected to one end of the wireless signal transceiver 2 through the first wire 3. The other end of the wireless signal transceiver 2 is electrically connected to an electronic device 4. That is to say, the wireless signal transceiver 2 is disposed in a port of the electronic device 4. The electronic device 4 is a desktop computer, a notebook computer, a tablet computer or a smartphone, and the present disclosure is not limited thereto.

As shown in FIG. 2, the first mouse 1 is wirelessly and communicatively connected to the wireless signal transceiver 2.

As shown in FIG. 3, the first mouse 1 includes a control module 11, a cursor positioning sensing module 12, a mouse wireless communication module 13, a power module 14, and a mouse port 15. The control module 11 is electrically connected to the cursor positioning sensing module 12, the mouse wireless communication module 13, the power module 14, and the mouse port 15. In this embodiment, since the first mouse 1 does not include a USB processing module, the communication signals between the control module 11, and each of the cursor positioning sensing module 12, the mouse wireless communication module 13, the power module 14, and the mouse port 15 have signal formats for the communication between components only. That is to say, the signal formats of the signals between the control module 11, and each of the cursor positioning sensing module 12, the mouse wireless communication module 13, the power module 14, and the mouse port 15 are in Serial Peripheral Interface Bus (SPI), or Inter-Integrated Circuit Bus (I$^2$C) signal formats. Moreover, signals transmitted or received by the mouse port 15 are also in SPI or I$^2$C signal formats. In other embodiments, the signal formats of the signals between the control module 11, and each of the cursor positioning sensing module 12, the mouse wireless communication module 13, the power module 14, and the mouse port 15, as well as the signal format of the signal transmitted or received by the mouse port 15 can be designed according to practical requirements, and the present disclosure is not limited thereto.

As shown in FIG. 4, the wireless signal transceiver 2 includes a processing module 21, a USB signal processing module 22, a wireless communication module 23, a first port 24, a second port 25, and a storing module 26. The processing module 21 is electrically connected to the USB signal processing module 22, the wireless communication module 23, and the storing module 26. The USB signal processing module 22 is electronically connected to the first port 24 and the second port 25. The wireless communication module 22 is electronically connected to the processing module 21 and the storing module 26. The first port 24 is electronically connected to the electronic device 4. In this embodiment, the second port 25 is a male port. In other embodiments, the second port 25 can be a female port. Moreover, the wireless transceiver 2 further includes a switch element 27 that is electrically connected to the processing module 21. The wireless communication module 23 can be turned on and turned off by the turning on and turning off of the switch element 27. In this embodiment, when the switch element 27 is turned on, the processing module 21 turns on the wireless communication module 23, such that the wireless transceiver 2 can communicate with the first mouse 1. When the switch element 27 is turned off, the processing module 21 turns off the wireless communication module 23, such that the wireless transceiver 2 can only communicatively and electrically connected to the first mouse 1 through the first port 24.

Firstly, as shown in FIG. 1, when the wireless signal transceiver 2 is electrically connected to the electronic device 4, and the first mouse 1 can be electrically connected to the second port 25 of the wireless signal transceiver 2 through the first wire 3, a first mouse control signal of the control module 11 of the first mouse 1 is transmitted to the wireless signal transceiver 2 through the first wire 3 and then the wireless signal transceiver 2 converts the first mouse control signal into a USB protocol control signal utilizing the USB signal processing module 22. At this time, the wireless signal transceiver 2 transmits the USB protocol control signal to the electronic device 4 through the first port 24.

Secondly, as shown in FIG. 2, when the wireless signal transceiver 2 is electrically connected to the electronic device 4 and the first mouse 1 is not electrically connected to the second port 25 of the wireless signal transceiver 2 through the first wire 3, the first mouse control signal of the control module 11 of the first mouse 1 is transmitted to the wireless communication module 23 of the wireless signal transceiver 2 through the mouse wireless communication module 13, the wireless signal transceiver 2 converts the first mouse control signal into a USB protocol control signal utilizing the USB signal processing module 22, and then the USB protocol control signal is transmitted to the electronic device 4 through the first port 24. In FIG. 2, the first mouse 1 and the wireless signal transceiver 2 are wirelessly and communicatively connected, but since the first mouse 1 does not include the USB signal processing module 22, the signal format of the first mouse control signal of the first mouse 1 is a communication protocol signal format, e.g., an SPI or an I²C signal format, instead of a USB communication protocol signal format. Therefore, after a wireless signal transmitted from the first mouse 1 to the wireless signal transceiver 2 is interpreted, the signal format of the first mouse control signal is still a communication protocol signal format, e.g., an SPI or an I²C signal format. Thus, the wireless signal requires conversion of the USB signal processing module 22 before being transmitted to the electronic device 4.

Since the first mouse 1 can be electrically connected to the second port 25 of the wireless signal transceiver 2 through the first wire 3, the first wire 3 is only required to transmit communication protocol signal formats, e.g., SPI or I²C signal format, and not required to transmit high power. Therefore, the first wire 3 includes a copper wire with the standard wire diameter or a plurality of copper wires with smaller wire diameters. A standard USB wire usually has a 20-28 American wire gauge (AWG) wire diameter, and the first wire 3 in this embodiment can have a diameter that is smaller than or equal to 28 AWG Since the copper wire of the first wire 3 has a smaller wire diameter, the flexibility of the first wire 3 is greater than the usual standard USB wire. That is to say, the first wire 3 is a wire having a high flexibility. In this embodiment, when the first mouse 1 is connected to the wireless transceiver 2 through the first wire 3, and the wireless transceiver 2 is electrically connected to the electronic device 4, the electronic device 4 can charge the first mouse 1 through the wireless transceiver 2 and the first wire 3.

In addition, when the first mouse 1 is electrically or communicatively connected to the wireless signal transceiver 2, the control module 11 of the first mouse 1 is able to transmit the mouse configuration setting data of the first mouse 1 to the storing module 26 of the wireless signal transceiver 2 for storage, and the control module 11 of the first mouse 1 can receive the mouse configuration setting data of the first mouse 1 from the storing module 26 of the wireless signal transceiver 2. That is to say, the wireless signal transceiver 2 can assist to store the mouse configuration setting data of the first mouse 1. Moreover, a mouse motion signal correspondence table of the first mouse 1 can also be stored in the storing module 26 of the wireless signal transceiver 2. Furthermore, since the mouse configuration setting data and the mouse motion signal correspondence table of the first mouse 1 are stored in the storing module 26 of the wireless signal transceiver 2, when the first mouse 1 is electrically connected to the wireless signal transceiver 2, the first mouse 1 is only required to transmit a plurality of motion trigger signals to the wireless signal transceiver 2. The wireless signal transceiver 2 can then transmit the plurality of motion trigger signals corresponding to the first mouse 1 to the electronic device 4 according to the plurality of motion trigger signals transmitted by the first mouse 1 and the mouse configuration setting data and the mouse motion signal correspondence table stored in the wireless signal transceiver 2, so as to control the motion of the cursor. Thus, the volume of data transmission between the first mouse 1 and the wireless signal transceiver 2 can be significantly reduced, and the power consumption of the first mouse 1 can also be further reduced.

The control module 11 and the processing module 21 are a central processing unit (CPU), a microprocessor, or an application-specific integrated circuit (ASIC), and the present disclosure is not limited thereto. The cursor positioning sensing module 12 is a roller sensing module, an optical sensing module, or a laser sensing module, and the present disclosure is not limited thereto. The cursor positioning sensing module 12 controls the distance and the direction of the motion of the cursor. The power module 14 provides a driving power to the control module 11, the cursor positioning sensing module 12, the mouse wireless communication module 13, and the mouse port 15 of the first mouse 1. In this embodiment, the power module 14 is a battery module.

The storing module 26 can be a flash memory, a read-only memory, a programmable read-only memory, an electrically rewritable read-only memory, an erasable and programmable read-only memory, and an electrically erasable and programmable read-only memory, and the present disclosure is not limited thereto. The mouse wireless communication module 13 and the wireless communication module 23 are each one of a Wi-Fi communication unit, a Bluetooth® communication unit, a Zigbee® communication unit, a second-generation mobile communication technology (2G) communication unit, a third-generation mobile communication technology (3G) communication unit, a fourth-generation mobile communication technology (4G) communication unit, a fifth-generation mobile communication technology (5G) communication unit, a LoRa communication unit, a Sigfox communication unit, and an NB-IoT communication unit. The mouse port 15 is a serial port or a microUSB port, but the present disclosure is not limited thereto. In FIG. 1, the control module 11 transmits multiple first mouse control signals to the wireless signal transceiver 2 through the mouse port 15 and the first wire 3.

Figure 5:
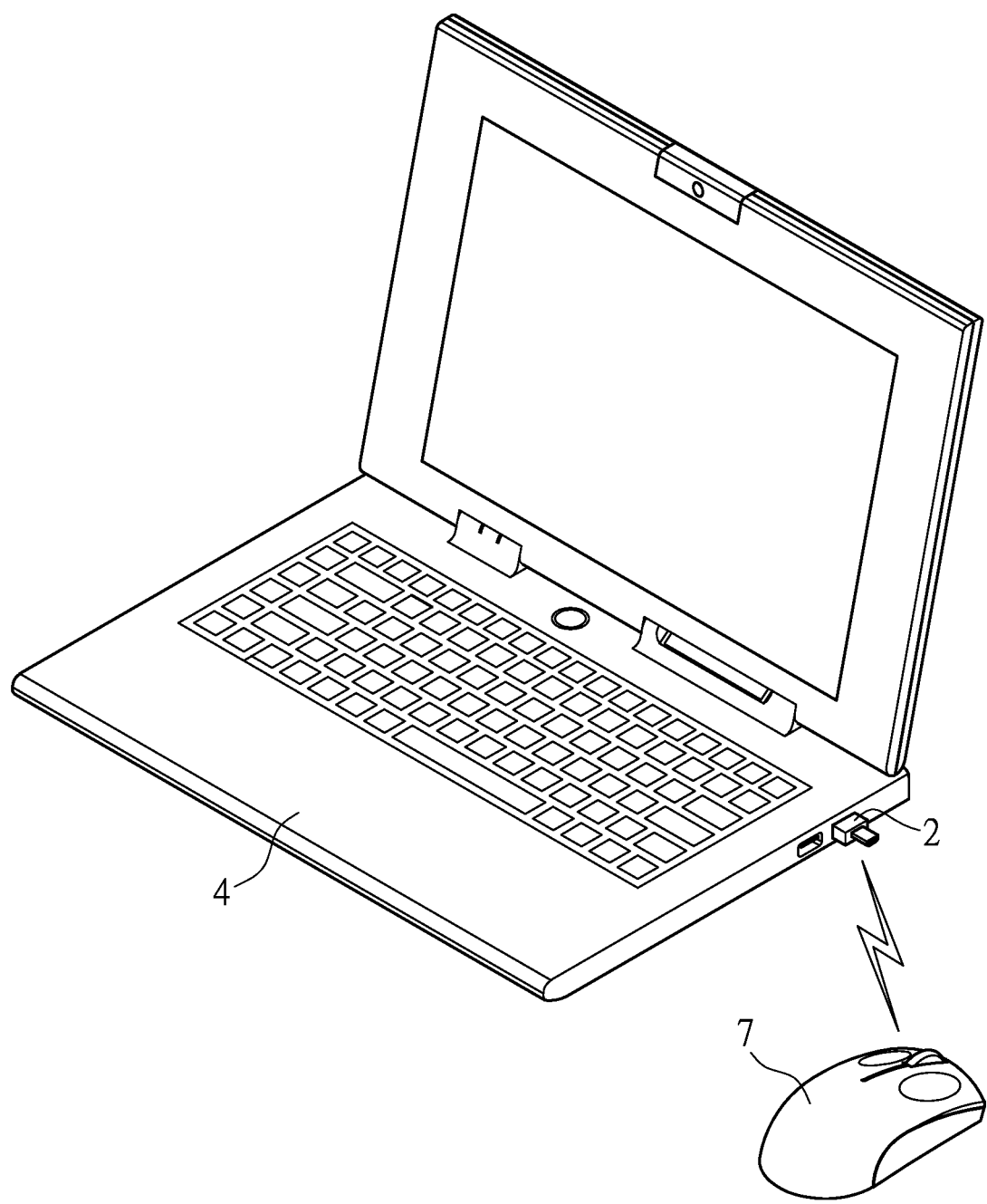
FIG. 5 is a schematic view of a second mouse and a wireless signal transceiver operating cooperatively in one embodiment of the present disclosure.

Reference is made to FIG. 5, which is a schematic view of a second mouse and the wireless signal transceiver operating cooperatively in one embodiment of the present disclosure.

In this embodiment, a user can utilize another mouse to communicatively connect to the wireless signal transceiver 2. When the user utilizes a second mouse 7 to wirelessly and communicatively connect to the wireless signal transceiver 2 or wiredly and electrically connect to the wireless signal transceiver 2, the second mouse 7 provides a configuration download request signal and a second device code of the second mouse 7 to the wireless signal transceiver 2, and then the wireless signal transceiver 2 determines whether or not to provide the mouse configuration setting data to the second mouse 7 according to the configuration download request signal and the second device code. When the wireless signal transceiver 2 is to provide the mouse configuration setting data to the second mouse 7, the second mouse 7 is then able to download the mouse configuration setting data stored in the wireless signal transceiver 2. After the second mouse 7 downloads the mouse configuration setting data stored in the wireless signal transceiver 2, the second mouse 7 provides a second mouse control signal to the electronic device 4 to conduct a cursor motion control through the wireless signal transceiver 2. In this embodiment, the first device code of the first mouse 1 has already been provided to the wireless signal transceiver 2.

Figure 6:
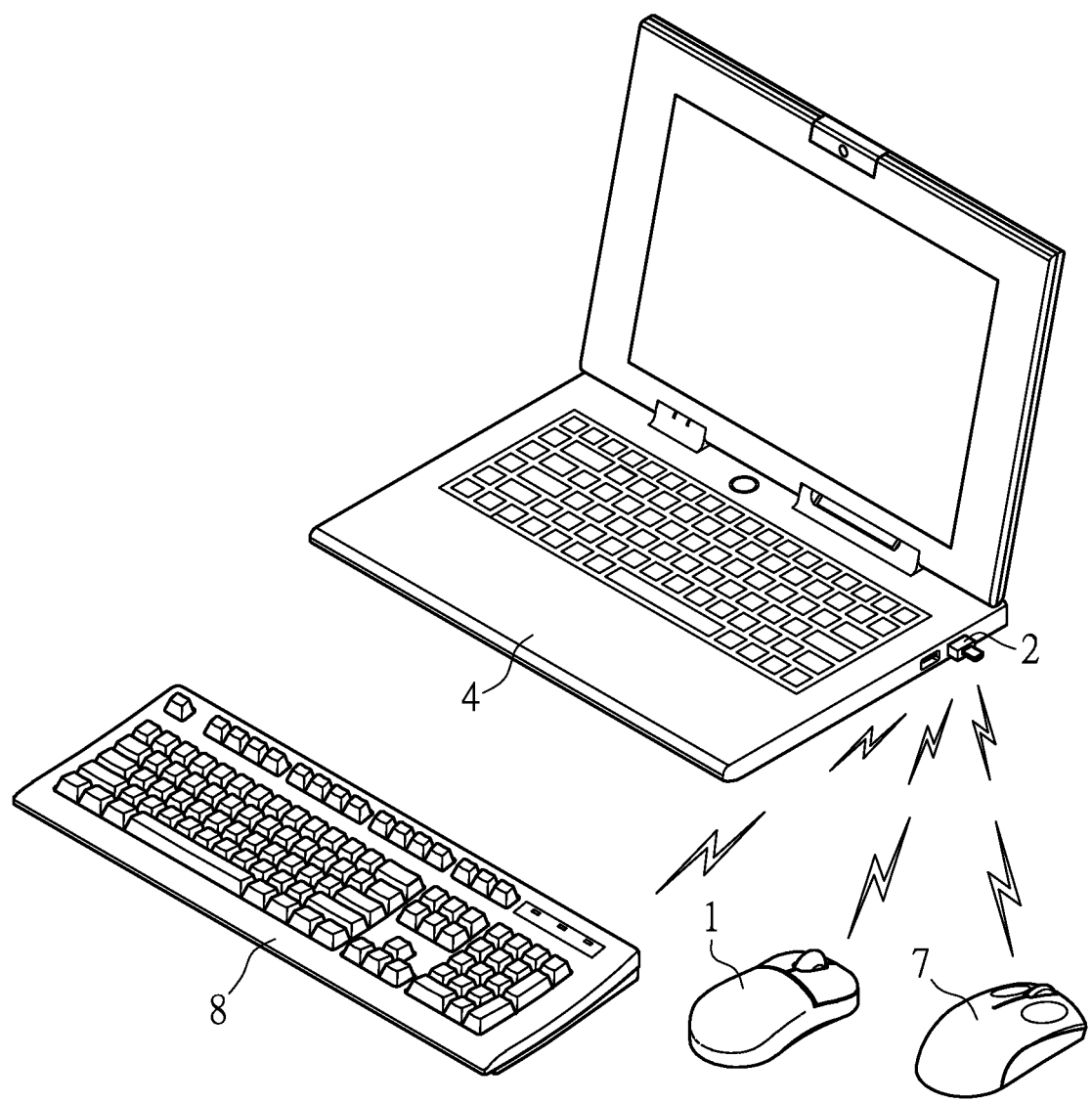
FIG. 6 is a schematic view of a first mouse, a second mouse, and a keyboard operating cooperatively with a wireless signal transceiver in one embodiment of the present disclosure.

Reference is made to FIG. 6, which is a schematic view of the first mouse, the second mouse and a keyboard operating cooperatively with the wireless signal transceiver in one embodiment of the present disclosure.

In FIG. 6, the first mouse 1 and the second mouse 7 are correspondingly communicatively connected to the wireless signal transceiver 2 and have identical mouse configuration setting data. The first mouse 1 and the second mouse 7 can respectively transmit the first mouse control signal and second mouse control signal to the wireless signal transceiver 2 to conduct the cursor motion control of the electronic device 4.

In addition, a keyboard configuration setting data of the keyboard 8 can also be stored in the storing module 26 of the wireless signal transceiver 2, and the keyboard 8 can transmit a button control signal to the electronic device 4 through the wireless signal transceiver 2 for data input.

One of the advantages of the present disclosure is that the dual mode mouse provided by the present disclosure can reduce the data transmission volume between the mouse and the wireless signal transceiver and effectively reduce the cost through the unique design of the mouse and the wireless signal transceiver.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual mode mouse device, which is adapted to utilizing a first port to electrically connect to an electronic device and utilizing a mouse wireless communication module to wirelessly connect to the electronic device, the dual mode mouse device comprising:
    a first mouse including:
        a control module;
        a cursor positioning sensing module electrically connected to the control module;
        a power module electrically connected to the control module;
        the mouse wireless communication module electrically connected to the control module; and
        a mouse port electrically connected to the control module;
    wherein the control module transmits a plurality of control signals, and the control module is electrically connected to the cursor positioning sensing module, the power module and the mouse wireless communication module of the first mouse; and
    a wireless signal transceiver including:
        a processing module;
        the first port;
        a second port;
        a wireless communication module; and
        a USB signal processing module electrically connected to the first port, the second port, and the processing module;
    wherein the wireless communication module is electrically connected to the processing module;
    wherein when the first mouse is electrically connected to the second port of the wireless signal transceiver through a first wire, a first mouse control signal of the control module of the first mouse is transmitted to the wireless signal transceiver through the first wire, and the wireless signal transceiver utilizes the USB signal processing module to convert the first mouse control signal into a USB communication protocol control signal that is provided to the electronic device;
    wherein when the first mouse is not electrically connected to the second port of the wireless signal transceiver through the first wire, the first mouse control signal of the control module of the first mouse is transmitted to the wireless communication module of the wireless signal transceiver by the mouse wireless communication module, and the first mouse control signal is then provided to the electronic device, through the USB signal processing module, by the processing module of the wireless signal transceiver.

2. The dual mode mouse device according to claim 1, wherein the first mouse control signal of the control module of the first mouse is a Serial Peripheral Interface Bus (SPI) signal, or an Inter-Integrated Circuit Bus (I$^2$C) signal.

3. The dual mode mouse device according to claim 1, wherein the first wire includes one or more unit wires, and a wire diameter of the unit wire is smaller than or equal to 28 American wire gauge (AWG).

4. The dual mode mouse device according to claim 1, wherein the communication signals between the control module of the first mouse and the cursor positioning sensing module, the communication signals between the control module of the first mouse and the first mouse wireless communication module, and the communication signals between the control module of the first mouse and the first mouse port are each one of a Serial Peripheral Interface Bus (SPI) signal and an Inter-Integrated Circuit Bus (I$^2$C) signal.

5. The dual mode mouse device according to claim 1, wherein the first mouse further includes a mouse storing module, the control module of the first mouse is electrically connected to the mouse storing module, the wireless signal transceiver further includes a storing module, the wireless communication module of the wireless signal transceiver is electrically connected to the storing module, and wherein a mouse configuration setting data of the first mouse and a mouse motion signal correspondence table are stored in the mouse storing module of the first mouse and the storing module of the wireless signal transceiver, the first mouse transmits a motion trigger signal to the wireless signal transceiver, and then the wireless transceiver transmits a mouse motion signal corresponding to the motion trigger signal to the electronic device according to the motion trigger signal and the mouse motion signal correspondence table.

6. The dual mode mouse device according to claim 5, wherein when a second mouse is wirelessly and communicatively connected to the wireless signal transceiver, or when the second mouse is wiredly and electrically connected to the wireless signal transceiver, the second mouse provides a configuration download request signal and a second device code to the wireless signal transceiver, and then the wireless signal transceiver determines whether or not to provide the mouse configuration setting data to the second mouse according to the configuration download request signal and the second device code.

7. The dual mode mouse device according to claim 6, wherein after the second mouse downloads the mouse configuration setting data, the second mouse provides a second mouse control signal to the electronic device through the wireless signal transceiver to conduct a motion control of a cursor of the electronic device.

8. The dual mode mouse device according to claim 7, wherein the first mouse and the second mouse respectively transmit the first mouse control signal and the second mouse control signal through the wireless signal transceiver to conduct the motion control of the cursor.

9. The dual mode mouse device according to claim 5, wherein a keyboard configuration setting data is stored in the storing module of the wireless signal transceiver.

\* \* \* \* \*